United States Patent
Zhu et al.

(10) Patent No.: US 9,049,110 B2
(45) Date of Patent: Jun. 2, 2015

(54) METHOD AND APPARATUS FOR COORDINATING THE SYSTEM ROBUSTNESS

(75) Inventors: Weihong Zhu, Shenzhen (CN); Yanqin Gao, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 229 days.

(21) Appl. No.: 12/810,621

(22) PCT Filed: Dec. 26, 2007

(86) PCT No.: PCT/CN2007/003819
§ 371 (c)(1),
(2), (4) Date: Jul. 28, 2010

(87) PCT Pub. No.: WO2009/082837
PCT Pub. Date: Jul. 9, 2009

(65) Prior Publication Data
US 2010/0313062 A1   Dec. 9, 2010

(51) Int. Cl.
*G06F 11/00* (2006.01)
*H04L 12/24* (2006.01)

(52) U.S. Cl.
CPC ........ *H04L 41/0654* (2013.01); *H04L 41/0816* (2013.01)

(58) Field of Classification Search
USPC .......................................................... 714/47
See application file for complete search history.

(56) References Cited

U.S. PATENT DOCUMENTS 7,218,928 B2   5/2007   Park et al.
7,342,954 B2   3/2008   Fitton et al.

(Continued)

FOREIGN PATENT DOCUMENTS

| CN | 1507713 A | 6/2004 |
|----|-----------|--------|
| CN | 1992952 A | 7/2007 |
| WO | WO 99/16274 A1 | 4/1999 |
| WO | WO 03/055251 | 7/2003 |

OTHER PUBLICATIONS

International Search Report for International Application No. PCT/CN2007/003819, completed Sep. 19, 2008, mailed Oct. 16, 2008 (Chinese Language) (2 pages).

(Continued)

*Primary Examiner* — Sarai Butler
(74) *Attorney, Agent, or Firm* — Li & Cai Intellectual Property (USA) Office

(57) ABSTRACT

The present invention discloses a method for coordinating system robustness. The method comprises: a system robustness detecting and coordinating module receives the state data of a system, and judges the type of the state-related data received; when the type of the state-related data received is determined as a performance-related data, the system robustness detecting and coordinating module analyzes the performance-related data; when the type of the state-related data received is determined as a fault-related data, the system robustness detecting and coordinating module invokes an automatic repairing module to analyze the fault-related data received; under the circumstance that the analysis result of the system robustness detecting and coordinating module or the automatic repairing module is that an automatic adjustment is needed to be performed, the type of the automatic adjustment which is needed to be performed is judged, and a corresponding module is invoked to perform adjustment. In addition, the present invention also discloses an apparatus for coordinating the system robustness. The level of the automatic management and maintenance of the mobile communication system can be improved effectively and the maintenance cost can be reduced effectively by using the present invention.

10 Claims, 3 Drawing Sheets

(56) References Cited

U.S. PATENT DOCUMENTS

| | | | |
|---|---|---|---|
| 2002/0078017 | A1 | 6/2002 | Cerami et al. |
| 2002/0087680 | A1* | 7/2002 | Cerami et al. ............... 709/224 |
| 2005/0060598 | A1* | 3/2005 | Klotz et al. ..................... 714/4 |
| 2005/0064820 | A1 | 3/2005 | Park et al. |
| 2005/0154716 | A1 | 7/2005 | Watson et al. |
| 2005/0198279 | A1* | 9/2005 | Flocken et al. ............. 709/224 |
| 2007/0220308 | A1* | 9/2007 | Yeung et al. ..................... 714/5 |

OTHER PUBLICATIONS

International Preliminary Report on Patentability for International Application No. PCT/CN2007/003819, issued Jun. 29, 2010 (Chinese Language) (4 pages).

English Language Translation of the International Preliminary Report on Patentability for International Application No. PCT/CN2007/003819, issued Jun. 29, 2010 (4 pages).

Written Opinion of the International Searching Authority for International Application No. PCT/CN2007/003819, completed Sep. 22, 2008, mailed Oct. 16, 2008 (Chinese Language) (3 pages).

English Language Translation of the Written Opinion of the International Searching Authority for International Application No. PCT/CN2007/003819, completed Sep. 22, 2008, mailed Oct. 16, 2008 (3 pages).

European Patent Office, Supplementary Search Report and the European Search Opinion issued on Nov. 19, 2013.

* cited by examiner

METHOD AND APPARATUS FOR COORDINATING THE SYSTEM ROBUSTNESS

CROSS-REFERENCE TO RELATED APPLICATIONS

This application is a U.S. National Stage filing under 35 U.S.C. §371 of international application PCT/CN2007/003819, filed Dec. 26, 2007.

FIELD OF THE INVENTION

The present invention relates to communication field, and in particular to a method and an apparatus for coordinating the system robustness used in a mobile communication system.

BACKGROUND OF THE INVENTION

During the operation of the mobile communication system, the situation may occur that the system robustness degrades resulted from the reasons such as fault, inappropriate configuration or the increase of the number of users. The system needs to be maintained in this situation. In general, the maintenance modes comprise capacity expansion, reconfiguration, system optimization, software upgrading, hardware replacement or upgrading and so on. The system robustness described in present application refers to the ability of the system for completing normal functions and providing normal services.

When the system is maintained during the operation of the mobile communication system, the operator has to expend plenty of manpower and material resources. In order to reduce the maintenance cost, at present, automatic processing technology has been gradually added into the management system of the mobile communication system so as to quicken the fault solving speed, to reduce manpower participation degree, to reduce the manpower and time costs of maintenance, and to maintain the system robustness at a reasonable level.

At present, some schemes for improving the automation level of the management system have been proposed, including automatic diagnosis, automatic configuration, automatic optimization and so on. However, these functions are still relatively independent modules at present, and need to be started or adjusted manually, which can obviously not realize the automatic coordination of the system robustness.

However, a scheme which can automatically realize the coordination of the system robustness has not been proposed yet.

SUMMARY OF THE PRESENT INVENTION

The present invention is proposed in consideration to the above-mentioned problems. For this reason, the present invention mainly aims at providing a method and an apparatus for coordinating system robustness to realize the coordination of system robustness automatically.

According to the embodiment of the present invention, a method for coordinating system robustness is provided.

The method comprises: a system robustness detecting and coordinating module receives the state data of a system, and judges the type of the state-related data received; when the type of the state-related data received is determined as a performance-related data, the system robustness detecting and coordinating module analyzes the performance-related data; when the type of the state-related data received is determined as a fault-related data, the system robustness detecting and coordinating module invokes an automatic repairing module to analyze the fault-related data received; under the circumstance that the analysis result of the system robustness detecting and coordinating module or the automatic repairing module is that an automatic adjustment is needed to be performed, the type of the automatic adjustment which is needed to be performed is judged, and a corresponding module is invoked to perform adjustment.

Wherein the type of the automatic adjustment comprises: automatic configuration processing and automatic optimization processing.

Under the circumstance that the analysis result of the system robustness detecting and coordinating module or the automatic repairing module to the state-related data is that the automatic configuration processing is needed to be performed, an automatic configuration module is invoked to perform the automatic configuration processing.

On the other hand, under the circumstance that the analysis result of the system robustness detecting and coordinating module or the automatic repairing module to the state-related data is that the automatic optimization processing is needed to be performed, an automatic optimization module is invoked to perform automatic optimization and an optimization result is obtained, and then the automatic configuration module is invoked to perform the automatic configuration processing according to the optimization result.

In addition, the above-mentioned performance-related data may comprise performance measurement data and key performance indicators; and the fault-related data comprises alarm information.

According to another embodiment of the present invention, an apparatus for coordinating system robustness is provided.

The apparatus comprises: a system robustness detecting and coordinating module, configured to receive the state data of a system, to judge the type of the state-related data received, to analyze, under the circumstance that the type of the state-related data received is determined as a performance-related data, the performance-related data, to judge, under the circumstance that an automatic adjustment is needed to be performed to the result of the analysis, the type of the automatic adjustment which is needed to be performed, and to invoke a corresponding module to perform adjustment; an automatic repairing module, configured to analyze, under the circumstance that the system robustness detecting and coordinating module determined that the type of the state-related data received is fault-related data, the fault-related data received, to judge, under the circumstance that an automatic adjustment is needed to be performed to the result of the analysis, the type of the automatic adjustment which is needed to be performed, and to invoke a corresponding module to perform adjustment.

Wherein the type of the above-mentioned automatic adjustment comprises: automatic configuration processing and automatic optimization processing.

The apparatus may further comprise: an automatic configuration module, configured to perform the automatic configuration processing when the analysis result of the system robustness detecting and coordinating module or the automatic repairing module to the state-related data is that the automatic configuration processing is needed to be performed, and to perform the automatic configuration processing according to an optimization result obtained by an automatic optimization module; the automatic optimization module, configured to perform the automatic optimization processing and to obtain the optimization result when the analysis result of the system robustness detecting and coordinating module or the automatic repairing module to the state-related data is that the automatic optimization processing is needed to be performed.

In addition, the above-mentioned performance-related data may comprise performance measurement data and key performance indicators; and the fault-related data comprises alarm information.

Through the above-mentioned technical scheme of the present invention, the level of the automatic management and maintenance of the mobile communication system can be improved effectively and the maintenance cost can be reduced effectively.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention, wherein.

DETAILED DESCRIPTION

Method Embodiment

In the present embodiment, a method for coordinating system robustness is provided.

Figure 1:
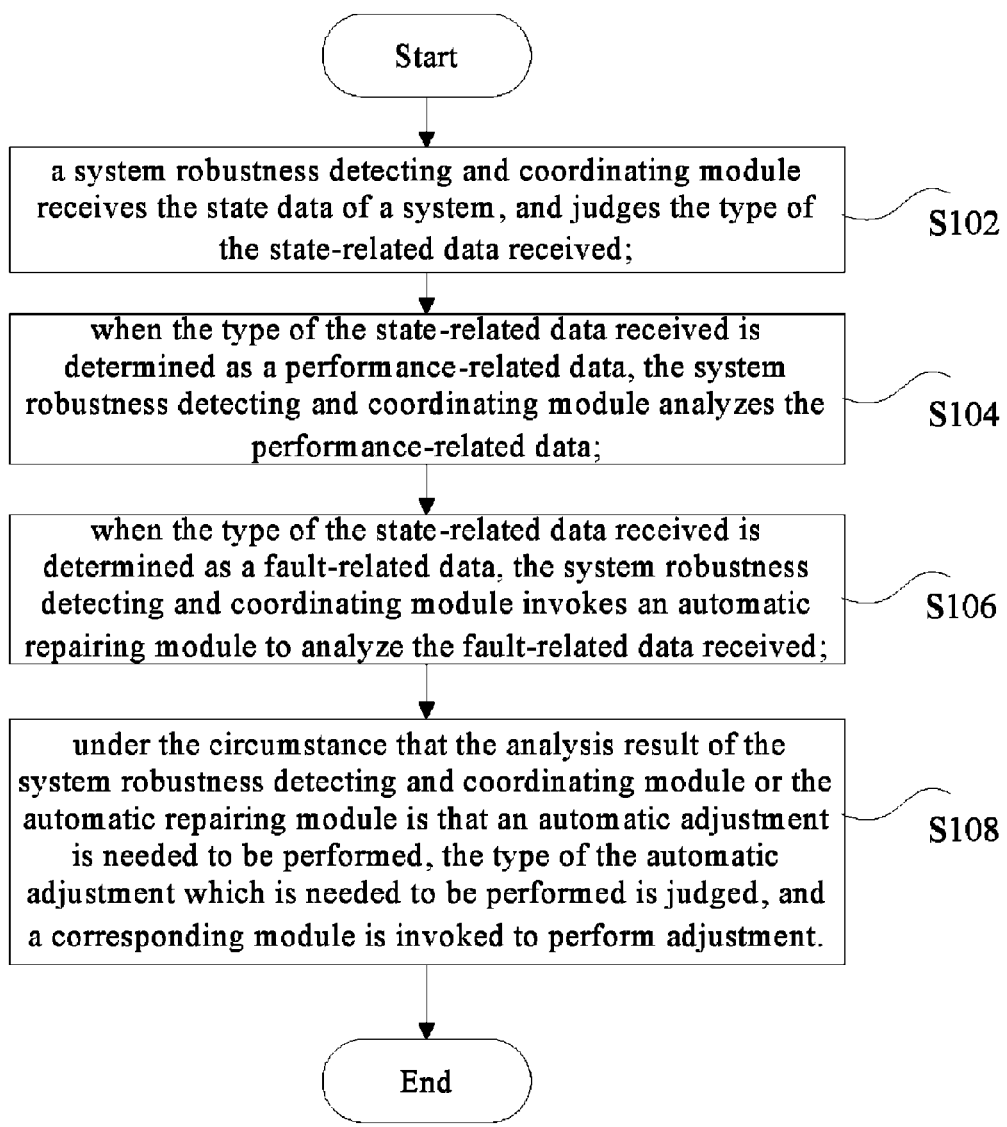
FIG. 1 is a flowchart of the method for coordinating system robustness according to the method embodiment of the present invention.

As shown in FIG. 1, the method for coordinating the system robustness according to the present embodiment comprises: step S102, a system robustness detecting and coordinating module receives the state data of a system, and judges the type of the state-related data received; S104, when the type of the state-related data received is determined as a performance-related data, the system robustness detecting and coordinating module analyzes the performance-related data; S106, when the type of the state-related data received is determined as a fault-related data, the system robustness detecting and coordinating module invokes an automatic repairing module to analyze the fault-related data received; S108, under the circumstance that the analysis result of the system robustness detecting and coordinating module or the automatic repairing module is that an automatic adjustment is needed to be performed, the type of the automatic adjustment which is needed to be performed is judged, and a corresponding module is invoked to perform adjustment.

Wherein the type of the automatic adjustment comprises: automatic configuration processing and automatic optimization processing.

Under the circumstance that the analysis result of the system robustness detecting and coordinating module or the automatic repairing module to the state-related data is that the automatic configuration processing is needed to be performed, an automatic configuration module is invoked to perform the automatic configuration processing.

On the other hand, under the circumstance that the analysis result of the system robustness detecting and coordinating module or the automatic repairing module to the state-related data is that the automatic optimization processing is needed to be performed, an automatic optimization module is invoked to perform automatic optimization and an optimization result is obtained, and then the automatic configuration module is invoked to perform the automatic configuration processing according to the optimization result.

In addition, the above-mentioned performance-related data may comprise performance measurement data and key performance indicators (KPI); and the fault-related data comprises a warning message.

Figure 2:
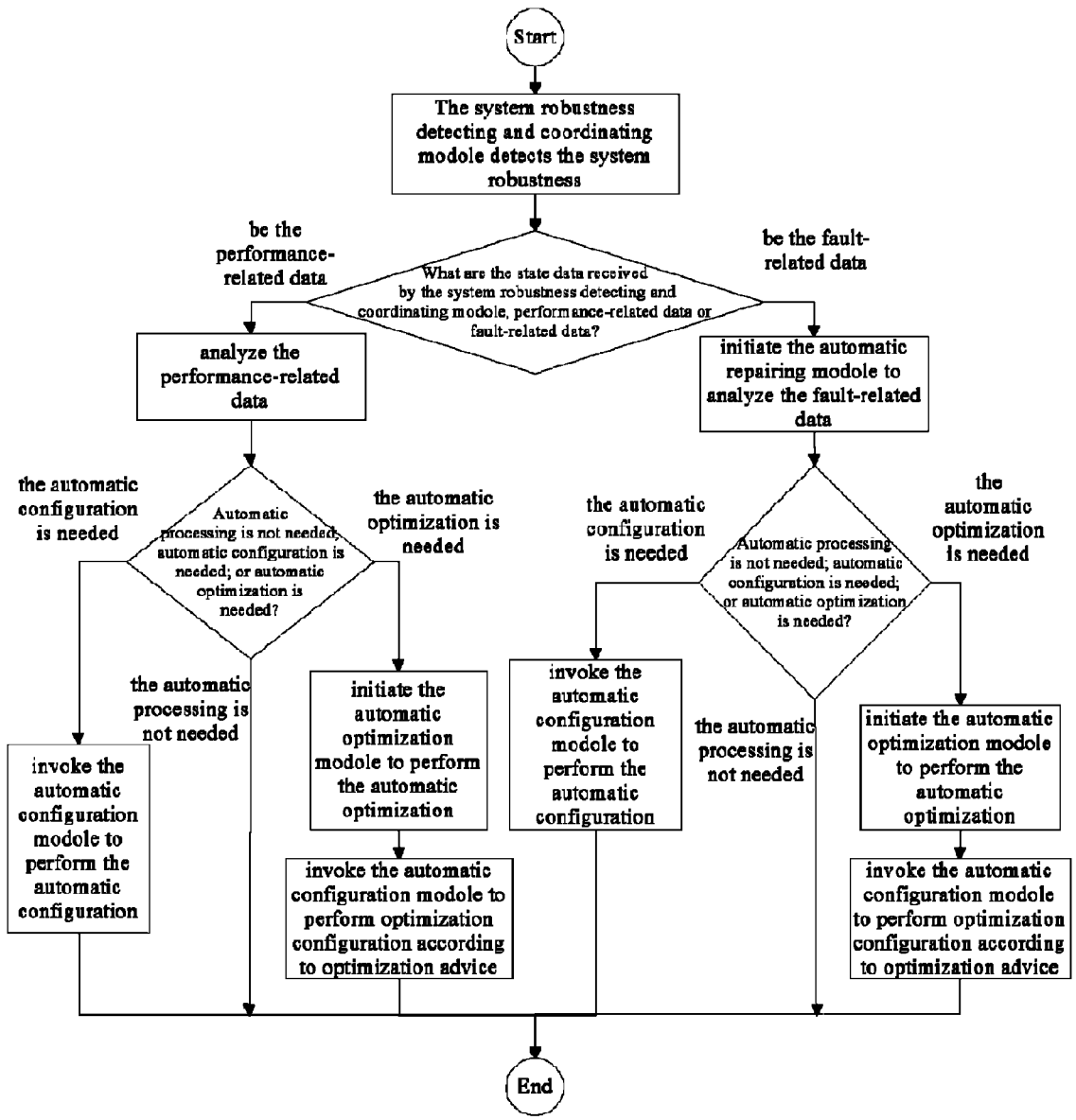
FIG. 2 is a detailed processing flowchart of the method for coordinating the system robustness according to the method embodiment of the present invention.

As shown in FIG. 2, when in actual implementation, this method may in particular comprise the following processing operations:

The system robustness detecting and coordinating module detects the system robustness. The detecting contents comprise performance-related data (for example, performance measurement data, KPIs and so on), fault-related data (for example, alarm information) and so on;

When the system robustness detecting and coordinating module receives the performance-related data, the system robustness detecting and coordinating module analyzes the performance-related data, and performs corresponding processing operations according to the analysis results, wherein the results may be: automatic processing is not needed; an automatic configuration is needed; and an automatic optimization is needed. If it is found that the automatic configuration is needed, the automatic configuration module is directly invoked to perform parameter adjustment or execute other configuration instruction (e.g. resetting); if it is found that the system needs to be optimized, the automatic optimization module is initiated to perform the automatic optimization, and after the automatic optimization module finishes the optimization work, the automatic configuration module is invoked to perform optimizing configuration to the system according to optimization advice.

When the system robustness detecting and coordinating module receives the fault-related data, the system robustness detecting and coordinating module initiates the automatic repairing module to analyze the fault-related data, and performs corresponding processing operations according to the analysis results. Wherein the results may be: the automatic processing is not needed; the automatic configuration is needed; and the automatic optimization is needed. If it is found that the automatic configuration is needed, the automatic configuration module is directly invoked to perform parameter adjustment or execute other configuration instruction (e.g. resetting); if it is found that the system needs to be optimized, the automatic optimization module is initiated to perform the automatic optimization, and after the automatic optimization module finishes the optimization work, the automatic configuration module is invoked to perform optimizing configuration to the system according to optimization advice.

Apparatus Embodiment

In the present embodiment, an apparatus for coordinating system robustness is provided.

Figure 3:
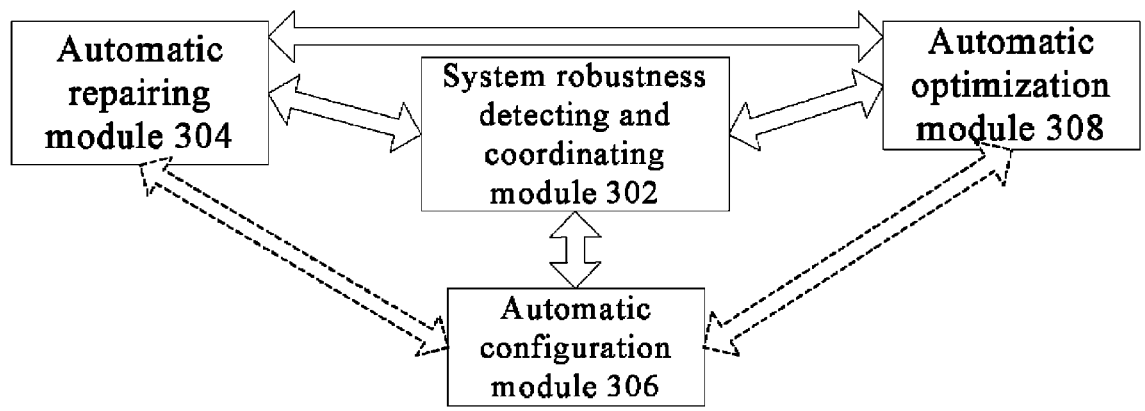
FIG. 3 is a block diagram of the apparatus for coordinating the system robustness according to the apparatus embodiment of the present invention.

As shown in FIG. 3, the apparatus for coordinating the system robustness according to the present embodiment comprises: a system robustness detecting and coordinating module 302, configured to receive the state data of a system, to judge the type of the state-related data received, to analyze, under the circumstance that the type of the state-related data received is determined as a performance-related data, the performance-related data, to judge, under the circumstance that an automatic adjustment is needed to be performed to the result of the analysis, the type of the automatic adjustment which is needed to be performed, and to invoke a corresponding module to perform adjustment; an automatic repairing module 304, configured to analyze, under the circumstance that the system robustness detecting and coordinating module determined that the type of the state-related data received is fault-related data, the fault-related data received, to judge, under the circumstance that an automatic adjustment is needed to be performed to the result of the analysis, the type of the automatic adjustment which is needed to be performed, and to invoke a corresponding module to perform adjustment.

That is to say, the automatic repairing module 304 analyzes the system fault-related information such as alarm information, and outputs corresponding configuration instruction or optimization scheme used for repairing the system fault or reducing the influence of the fault to the system.

Wherein the type of the above-mentioned automatic adjustment comprises: automatic configuration processing and automatic optimization processing.

The apparatus may further comprise: an automatic configuration module 306, configured to perform the automatic configuration processing when the analysis result of the system robustness detecting and coordinating module or the automatic repairing module to the state-related data is that the automatic configuration processing is needed to be performed, and to perform the automatic configuration processing according to an optimization result obtained by an automatic optimization module 308, i.e., configuration operations may be performed according to inputted configuration instructions; the automatic optimization module 308, configured to perform the automatic optimization processing and to obtain the optimization result when the analysis result of the system robustness detecting and coordinating module or the automatic repairing module to the state-related data is that the automatic optimization processing is needed to be performed, i.e., performance-related data may be analyzed to output an optimization configuration instruction (i.e., optimization result).

In addition, the above-mentioned performance-related data may comprise performance measurement data and key performance indicators; and the fault-warning related data comprises alarm information.

In addition, what should be paid attention to is that after the automatic repairing analysis and automatic optimization analysis are performed, the analysis result may be firstly returned to the system robustness detecting and coordinating module 302, and then the automatic configuration module 306 is initiated by the system robustness detecting and coordinating module 302; or the automatic configuration module 306 may be directly initiated by the automatic repairing module 304 or the automatic optimization module 308 as shown by the dotted line in FIG. 3.

To sum up, the present invention detects the system robustness through the system robustness detecting and coordinating module, performs analysis automatically, and initiates a corresponding automatic processing module when the system robustness degrades. For example, the present invention can first perform automatic diagnosis or automatic optimization, and then performs automatic configuration and so on according to the diagnosis or optimization results.

In virtue of the technical scheme of the present invention, the problem of the system robustness may be found in time, the automatic methods such as automatic repairing, automatic configuration, and automatic optimization can be used reasonably, therefore the level of the automatic management and maintenance of the mobile communication system can be improved effectively and the maintenance cost can be reduced effectively.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for coordinating system robustness, comprising:
   a system robustness detecting and coordinating device receiving the state data of a system, and judging the type of the state-related data received to determine whether the state-related data received is a performance-related data or a fault-related data;
   when the type of the state-related data received is determined as a performance-related data, the system robustness detecting and coordinating device analyzing the performance-related data to determine whether an automatic adjustment is needed to be performed; when the type of the state-related data received is determined as a fault-related data, the system robustness detecting and coordinating device invoking an automatic repairing device to analyze the fault-related data received to determine whether an automatic adjustment is needed to be performed;
   under the circumstance that an analysis result of the system robustness detecting and coordinating device or the automatic repairing device is that an automatic adjustment is needed to be performed, judging the type of the automatic adjustment which is needed to be performed, and invoking a corresponding module to perform adjustment;
   wherein the type of automatic adjustment comprises: automatic configuration processing and automatic optimization processing;
   wherein under the circumstance that an analysis result of the system robustness detecting and coordinating device or the automatic repairing device to the state-related data is that the automatic configuration processing is needed to be performed, an automatic configuration device is invoked to perform the automatic configuration processing;
   wherein after the automatic repairing device analyzes the fault-related data, the analysis result is firstly returned to the system robustness detecting and coordinating device, and then the automatic configuration device is initiated by the system robustness detecting and coordinating device;
   wherein the step of performing the automatic configuration processing comprises performing parameter adjustment or execute resetting.

2. The method according to claim 1, wherein under the circumstance that an analysis result of the system robustness detecting and coordinating device or the automatic repairing device to the state-related data is that the automatic optimization processing is needed to be performed, an automatic optimization device is invoked to perform automatic optimization and an optimization result is obtained, and then the automatic configuration device is invoked to perform the automatic configuration processing according to the optimization result.

3. The method according to claim 1, wherein the performance-related data comprises performance measurement data and key performance indicators; and the fault-related data comprises alarm information.

4. The method according to claim 1, wherein the performance-related data comprises performance measurement data and key performance indicators; and the fault-related data comprises alarm information.

5. The method according to claim 1, wherein the performance-related data comprises performance measurement data and key performance indicators; and the fault-related data comprises alarm information.

6. The method according to claim 2, wherein the performance-related data comprises performance measurement data and key performance indicators; and the fault-related data comprises alarm information.

7. An apparatus for coordinating system robustness, comprising:
a system robustness detecting and coordinating device, configured to receive the state data of a system, to judge the type of the state-related data received, to analyze, under the circumstance that the type of the state-related data received is determined as a performance-related data, the performance-related data to determine whether an automatic adjustment is needed to be performed, to judge, under the circumstance that an analysis result of the system robustness detecting and coordinating device is that an automatic adjustment is needed to be performed, the type of the automatic adjustment which is needed to be performed, and to invoke a corresponding module to perform adjustment;
an automatic repairing device, connected with the system robustness detecting and coordinating device and configured to analyze, under the circumstance that the system robustness detecting and coordinating device determined that the type of the state-related data received is fault-related data, the fault-related data received to determine whether an automatic adjustment is needed to be performed, to judge, under the circumstance that an analysis result of the automatic repairing device is that an automatic adjustment is needed to be performed, the type of the automatic adjustment which is needed to be performed, and to invoke a corresponding module to perform adjustment;
wherein the type of the automatic adjustment comprises: automatic configuration processing and automatic optimization processing;
wherein the apparatus further comprises:
an automatic configuration device, connected with the automatic repairing device and the system robustness detecting and coordinating device and configured to perform the automatic configuration processing when the analysis result of the system robustness detecting and coordinating device or the automatic repairing device to the state-related data is that the automatic configuration processing is needed to the performed, and to perform the automatic configuration processing according to an optimization result obtained by an automatic optimization device;
the automatic optimization device, connected to with the automatic repairing device and the system robustness detecting and coordinating device and the automatic configuration device and configured to perform the automatic optimization processing and to obtain the optimization result when the analysis result of the system robustness detecting and coordinating device or the automatic repairing device to the state-related data is that the automatic optimization processing is needed to be performed;
wherein after the automatic repairing device analyzes the fault-related data, the analysis result is firstly returned to the system robustness detecting and coordinating device, and then the automatic configuration device is initiated by the system robustness detecting and coordinating device;
wherein the automatic configuration device is further configured to perform the automatic configuration processing by following steps: performing parameter adjustment or execute resetting.

8. The apparatus according to claim 7, wherein the performance-related data comprise performance measurement data and key performance indicators; and the fault-related data comprises alarm information.

9. The apparatus according to claim 7, wherein the performance-related data comprise performance measurement data and key performance indicators; and the fault-related data comprises alarm information.

10. The apparatus according to claim 7, wherein the performance-related data comprise performance measurement data and key performance indicators; and the fault-related data comprises alarm information.

* * * * *